No. 822,903. PATENTED JUNE 5, 1906.
W. A. PATTERSON.
METHOD OF SEPARATING COTTON.
APPLICATION FILED OCT. 15, 1904.
3 SHEETS—SHEET 2.
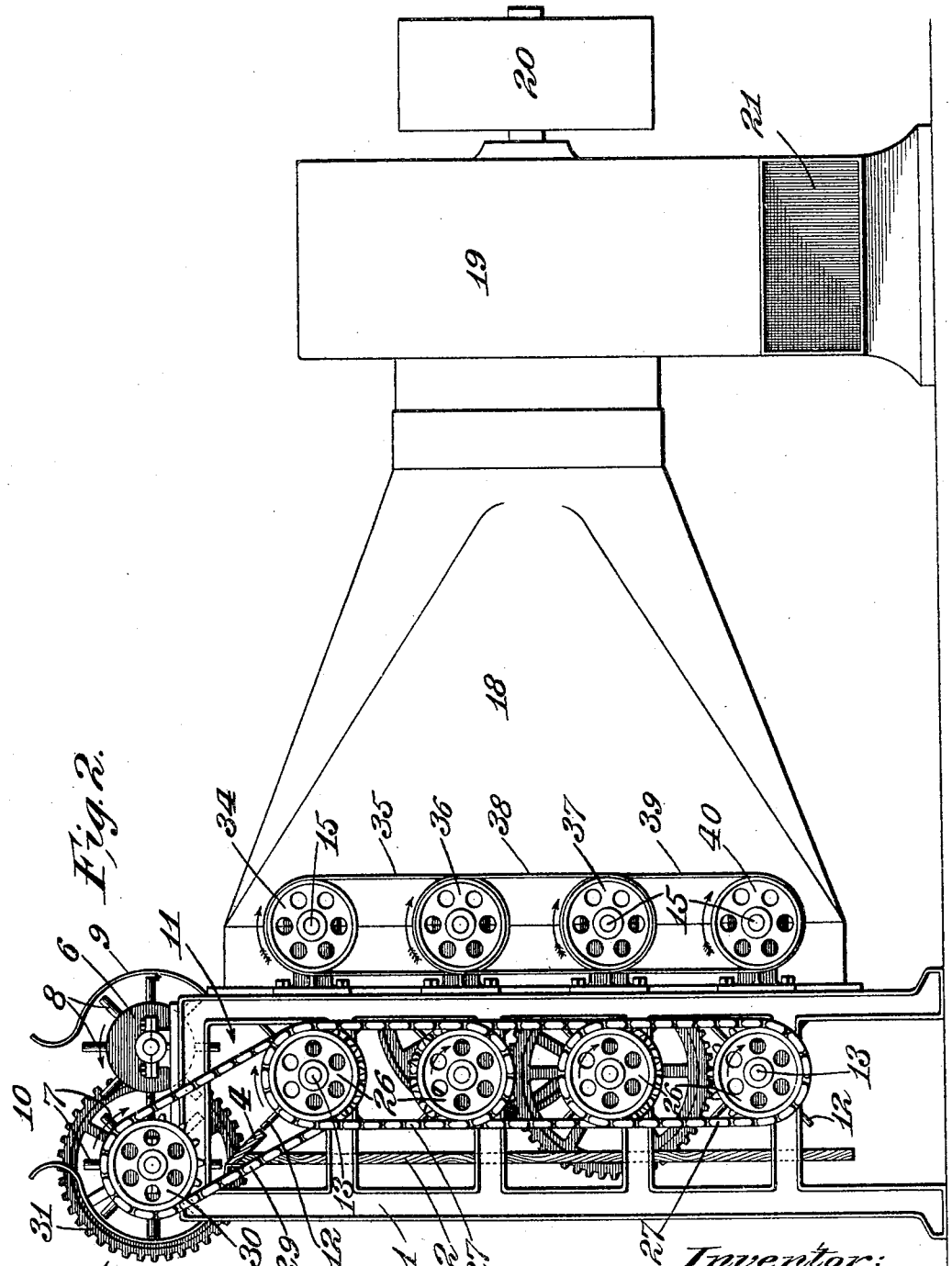

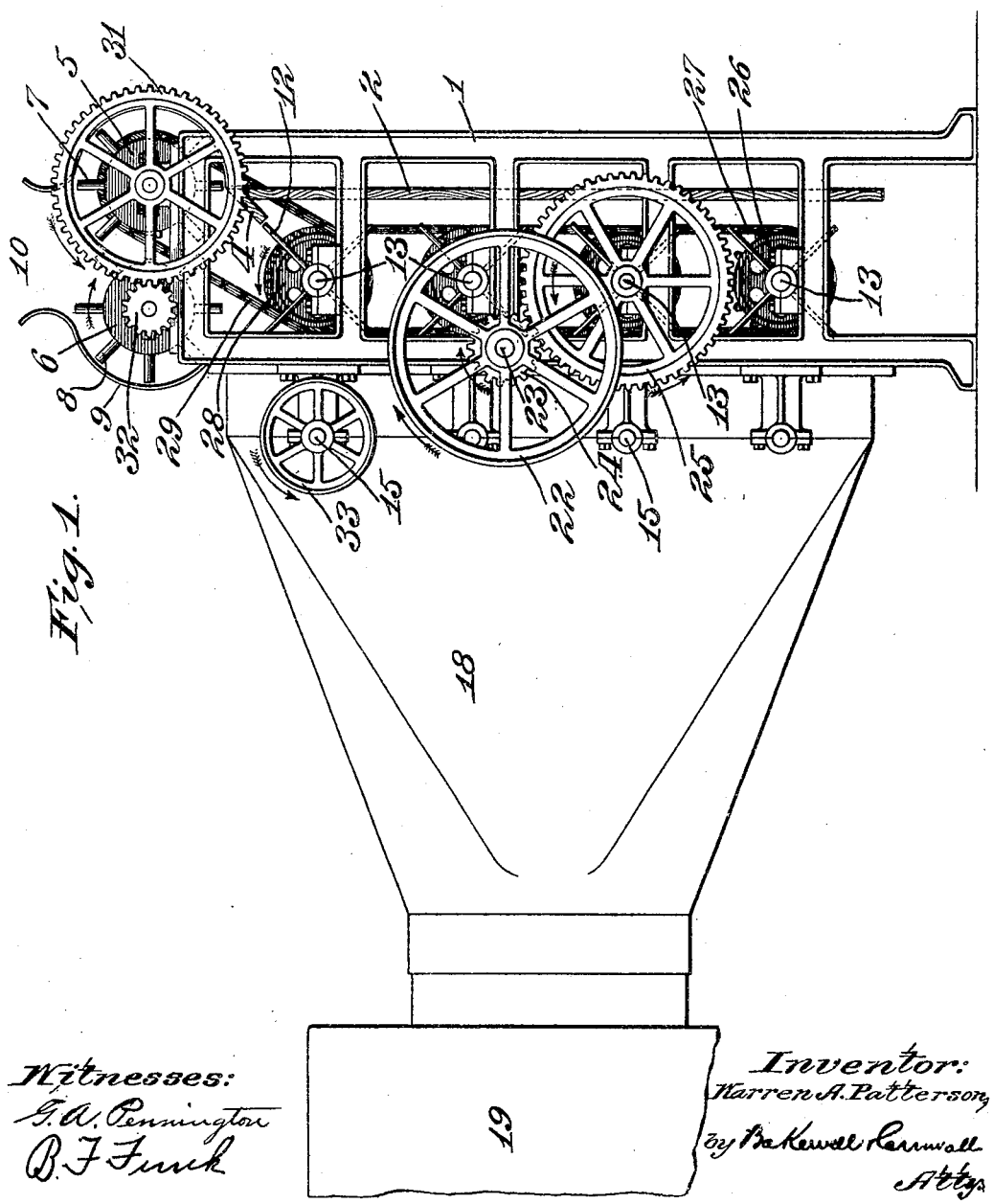

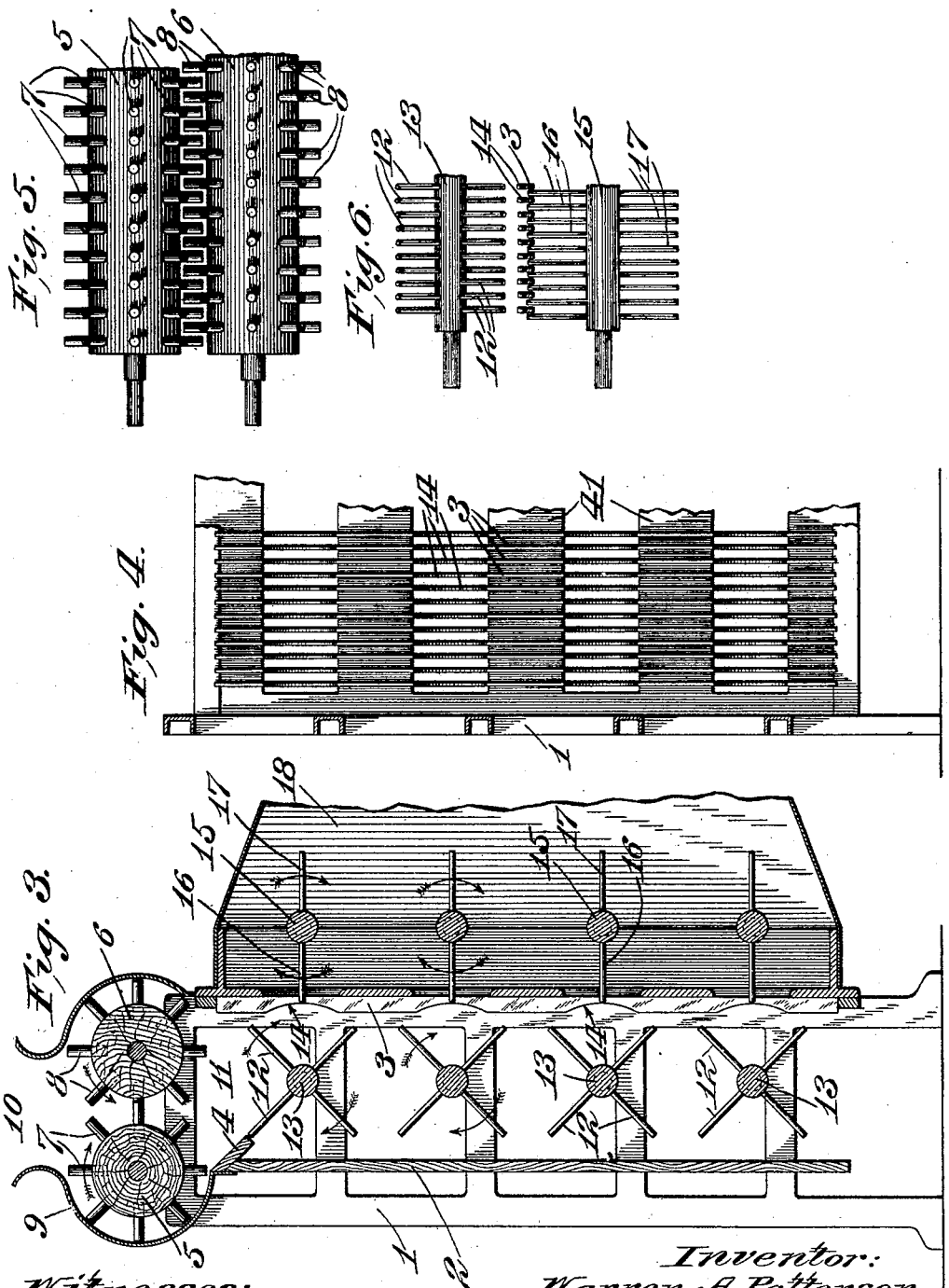

UNITED STATES PATENT OFFICE.

WARREN A. PATTERSON, OF ST. LOUIS, MISSOURI, ASSIGNOR TO AMERICAN COTTON SEPARATOR COMPANY, OF ST. LOUIS, MISSOURI, A CORPORATION OF OKLAHOMA TERRITORY.

METHOD OF SEPARATING COTTON.

No. 822,903.     Specification of Letters Patent.     Patented June 5, 1906.

Application filed October 15, 1904. Serial No. 228,577.

*To all whom it may concern:*

Be it known that I, WARREN A. PATTERSON, a citizen of the United States, residing at St. Louis, Missouri, have invented a certain new and useful Improvement in Methods of Separating Cotton, of which the following is a full, clear, and exact description, such as will enable others skilled in the art to which it appertains to make and use the same, reference being had to the accompanying drawings, forming part of this specification, in which—

Figure 1 is a side elevational view of a cotton-separator for carrying out my improved method of separating the cotton from the bolls. Fig. 2 is a view in elevation of the reverse side of the machine. Fig. 3 is a vertical longitudinal sectional view through the machine, part of the suction-casing not being shown. Fig. 4 is an elevational view of a portion of the grate-bars. Fig. 5 is a plan view of the rollers at the top of the machine for agitating the bolls as they are fed thereinto; and Fig. 6 is a sectional view through the grate-bars, the boll-removing devices and the cotton-removing devices being shown in fragmentary plan.

This invention relates to a method for removing the cotton from the bolls after they are picked from the plant.

The method of picking cotton as generally practiced by hand consists in removing the cotton from the boll while still upon the plant. This has proven to be a tedious and undesirable method which requires considerable time, making it impossible to pick on an average more than one hundred and fifty pounds per working day.

It is the purpose of my invention to enable the picker to remove a much larger quantity of the cotton from the plant, and this is done by permitting the picker to remove the cotton while in the boll, or, in other words, to remove the boll from the plant and to separate the cotton from the boll mechanically assisted by the action of a suction device, the action of which will be fully explained hereinafter.

In order to clearly disclose the method practiced by me, I have illustrated in detail the preferred form of mechanism by which the desired result is accomplished.

In the machine illustrated in the drawings, 1 designates a frame carrying a baffle-board 2 opposite vertically-arranged and separated bars 3, the whole comprising an open casing. At the top of the baffle-board is an inclined feed-board 4, above which are arranged the parallel rollers 5 and 6. These rollers are provided with radial teeth, (designated by the reference-numerals 7 and 8, respectively,) said rollers being inclosed in a casing 9, having a receiving-opening 10. The cotton fed into the casing 9 is discharged at 11 into the casing formed by the frame 1, the board 2, and the bars 3, said cotton being fed onto the spikes or teeth 12 of the rollers 13. In the illustration there are four rollers spaced equidistantly apart and each provided with four rows of teeth, the ends of the teeth being adapted to move in close proximity to the curved portions 14 of the parallel bars 3, which bars are arranged in vertical series and are provided with the curved faces 14 in number equal to the number of rollers 13. Immediately in rear of these bars 3 are shafts 15, having diametrically oppositely located arms or teeth 16 and 17. These shafts, together with their arms 16 and 17, are located within the suction-chamber formed by the casing 18, which is in communication with a fan 19, driven by a suitable pulley 20 and having a discharge-opening 21, which will permit the cotton to be fed into a suitable receptacle provided at a convenient point and in communication with said fan-casing. The main drive-pulley 22 is journaled on a stub-shaft 23, carried by the frame 1, and said pulley carries a pinion 24 in mesh with a spur-gear 25, which in the present instance is journaled on the roller 13 second from the bottom, as clearly indicated in Figs. 1 and 2. Each of these rollers, which are in reality shafts, carry on their ends opposite from the side of the machine on which the gear 25 is located, sprocket-wheels 26, and are connected by sprocket-chains 27, by means of which they receive power to rotate at the same speed and in the same direction. On the uppermost shaft or roller 13 in the series is a sprocket 28, around which moves a chain 29, also passing around a sprocket 30 on the shaft of the roller 5, whereby said roller 5 is driven. On the opposite end of the shaft of roller 5 is a large gear 31, meshing with a smaller gear 32 on the shaft of the roller 6. The gears 31 and 32 are arranged so that the roller 6 will make about four revolutions to one revolution of the roller 5. This differential speed may be varied, however, as occasion demands.

The uppermost shaft in the series within suction-chamber is provided at one end with a drive-pulley 33, while the opposite end of said shaft carries a pulley 34, around which moves a belt 35 and in engagement with a pulley on the next succeeding lower shaft, which shaft is also provided with a pulley 36, imparting a rotary motion to the pulley 37 on the next succeeding lower shaft by means of a belt 38. A similar belt 39 imparts movement to the pulley 40 on the lowermost shaft 15, so that all of said shafts rotate in the same direction, it being understood that the shafts 13 and 15 rotate in the same direction, although the shafts 15 rotate at a speed greatly in excess of the speed of the shafts 13. The bars 3 are illustrated as being flat, but they may also be made round without affecting the efficiency of the method herein described.

In order to practice the method with a comparatively small fan and without sacrificing any advantage, I prefer to provide a series of transversely-arranged abutments 41, so as to divide the spaces between the bars into a number equal to the number of the shafts 13 and 15. The ends of the arms or fingers 16 and 17 do not extend through the spaces between the bars, but terminate slightly in rear of the curved faces, while the ends of the spikes or teeth 12 on the shafts or rollers 13 almost but do not touch the curved faces of the bars 3, and this is for the purpose of permitting the removal of the cotton in an efficient manner without tearing the fibers thereof.

Having described the machine, I will now describe the method practiced thereby. The cotton is fed into the receiving-opening 10 of the casing 9 by any suitable conveyer, or the cotton may be dumped therein by hand, if desired. It is to be understood that the cotton fed into this casing 9 is in its natural state with the bolls as they are pulled from the plant. As the bolls pass between the rollers 5 and 6 and as one of the rollers rotates more rapidly than the other said bolls will be sufficiently agitated to loosen the cotton-pods therein. They are then fed upon the uppermost boll-separating roller 13, so that the spikes or teeth 12 carry them over toward and against the bars 3. The suction caused by the fan 19 will have a tendency to draw the bolls tight against the bars, so that the fingers 16 and 17 contacting with the cotton-pods will pull them from the bolls in an upward direction, while the teeth or spikes 12 will have a tendency to retain the bolls, forcing them downwardly in the casing formed by the frame, or in the event that the cotton is not removed at the first operation the boll will be acted upon in a like manner by the next succeeding roller 13 and its coöperating shaft 15. Thus the operation will be continued until after the bolls have passed the last roller 13 with its coöperating shaft 15, by which time practically all of the bolls fed into the machine will have been freed of their cotton. As soon as the cotton is removed and pulled through the bars the suction-fan will draw it away form the shafts 15 and force it out through the outlet 21 into a suitable receptacle, (not shown,) so that the cotton will be freed from all dirt, trash, stones, and other foreign substances and will be in excellent condition for ginning. The bars are spaced apart so that the cotton can be easily pulled through from the bolls; but the bolls will not be permitted to pass therethrough, and foreign substances—such as sticks, stones, &c.— will also be prevented from passing between the bars, but will by gravity drop down through the frame of the machine. Thus the cotton is not only freed from the boll, but is to a considerable extent cleaned. Aside from this the bolls which are compact or not entirely ripe when they are fed into the machine will be considerably shaken up in passing through the machine, so that the fibers of the cotton will not lie so compactly together as to cause difficulty in ginning it, an advantage generally appreciated by those engaged in the cotton industry.

Having thus described my invention, what I claim as new, and desire to secure by Letters Patent, is—

1. The herein-described method of separating cotton from the bolls in which the cotton is incased, which consists in exerting pressure upon the boll-covering in one direction, and simultaneously subjecting the cotton fiber to pressure in the opposite direction and also to air-suction for withdrawing it from the boll; substantially as described.

2. The herein-described method of separating cotton from the bolls in which the cotton is incased, which consists in subjecting the bolls to pressure which forces them in one direction, simultaneously subjecting the cotton to pressure and also air-suction which forces it in an opposite direction and tends to remove it from the bolls, and thereafter repeating said operations until the cotton is completely removed; substantially as described.

In testimony whereof I hereunto affix my signature, in the presence of two witnesses, this 11th day of October, 1904.

WARREN A. PATTERSON

Witnesses:
  B. F. FUNK,
  GEORGE BAKEWELL.